(12) United States Patent
Girard et al.

(10) Patent No.: US 9,366,205 B2
(45) Date of Patent: Jun. 14, 2016

(54) PIPE SYSTEM FOR A FLUID, A METHOD AND AN APPARATUS FOR CONNECTING AT LEAST ONE DUCT PART OF A PIPE SYSTEM

(71) Applicant: MANN+HUMMEL GMBH, Ludwigsburg (DE)

(72) Inventors: Dominique Girard, Montigné le Brillant (FR); Maxime Sarrazin, Entrammes (FR)

(73) Assignee: MANN+HUMMEL GMBH, Ludwigsburg (DE)

( * ) Notice: Subject to any disclaimer, the term of this patent is extended or adjusted under 35 U.S.C. 154(b) by 170 days.

(21) Appl. No.: 14/039,229

(22) Filed: Sep. 27, 2013

(65) Prior Publication Data

US 2014/0090721 A1  Apr. 3, 2014

(30) Foreign Application Priority Data

Sep. 28, 2012 (EP) .................................... 12290322

(51) Int. Cl.
*F02M 35/10* (2006.01)
*F16L 47/22* (2006.01)
*B29C 49/00* (2006.01)

(52) U.S. Cl.
CPC ....... *F02M 35/1015* (2013.01); *F02M 35/1034* (2013.01); *F02M 35/10321* (2013.01); *F02M 35/10354* (2013.01); *F16L 47/22* (2013.01); *B29C 49/00* (2013.01); *Y10T 29/49826* (2015.01); *Y10T 29/53987* (2015.01); *Y10T 137/598* (2015.04)

(58) Field of Classification Search
CPC ..... F16L 33/22; F16L 47/22; F02M 35/1015; F02M 35/10321; F02M 35/1034
USPC ...................................... 137/315.01
See application file for complete search history.

(56) References Cited

U.S. PATENT DOCUMENTS

| | | | |
|---|---|---|---|
| 3,929,538 A | 12/1975 | Diebel | |
| 4,578,855 A | 4/1986 | Van Der Hagen | |
| 5,078,430 A * | 1/1992 | St. Onge | F16L 1/036 285/15 |
| 5,791,696 A * | 8/1998 | Miyajima et al. | F16L 11/11 285/222.1 |

FOREIGN PATENT DOCUMENTS

WO  9830827 A1  7/1998

OTHER PUBLICATIONS

EP Search report of EP 12290322 dated May 3, 2013.

* cited by examiner

*Primary Examiner* — Kevin Lee
(74) *Attorney, Agent, or Firm* — James Hasselbeck

(57) ABSTRACT

A pipe system for a fluid, in particular a gas of an intake system (10) or a turbocharger of an internal combustion engine is disclosed. Also disclosed is a method and an apparatus for connecting at least one duct part (12) of a pipe system (10). The pipe system (10) has at least one blow-molded duct part (12) made of plastic and at least one fitting (18) for connecting the at least one blow-molded duct part (12) with another part (20) of the pipe system (10). The fitting (18) is inserted tight in the at least one blow-molded duct part (12). The at least one blow-molded duct part (12) is shrinked onto the at least one fitting (18).

10 Claims, 3 Drawing Sheets

PIPE SYSTEM FOR A FLUID, A METHOD AND AN APPARATUS FOR CONNECTING AT LEAST ONE DUCT PART OF A PIPE SYSTEM

CROSS REFERENCE TO RELATED APPLICATIONS

This application claims the benefit under 35 USC 119 of EPO patent application EP 12290322.2 filed Sep. 28, 2012, and which is hereby incorporated by reference in its entirety.

TECHNICAL FIELD

The present invention relates to a pipe system for a fluid, in particular a gas, in particular of an intake system or a turbocharger of an internal combustion engine, in particular of a motor vehicle, having at least one blow-molded duct part made of plastic and at least one fitting for connecting the at least one blow-molded duct part with another part of the pipe system, whereby the fitting is inserted tight in the at least one blow-molded duct part.

The present invention relates further to a method for connecting at least one duct part of a pipe system for a fluid, in particular a gas, in particular of an intake system or a turbocharger of an internal combustion engine, in particular of a motor vehicle, with another part of the pipe system by use of at least one fitting, whereby the at least one duct part is made of plastic by a blow molding process and the at least one fitting is inserted tight in the at least one blow-molded duct part.

Additionally, the present invention relates to an apparatus for connecting at least one duct part of a pipe system for a fluid, in particular a gas, in particular of an intake system or a turbocharger of an internal combustion engine, in particular of a motor vehicle, with another part of the pipe system by use of at least one fitting, having an extruder for extruding a plastic material in a blowing mold for blow molding the at least one duct part and having a device for inserting the at least one fitting tight in the at least one blow-molded duct part.

BACKGROUND OF THE INVENTION

An air intake system of an internal combustion engine known from the market has a first blow-molded duct part made of plastic. A second duct part has a nipple for connection with the first duct part. The nipple of the second duct part is inserted in a connection end of the first duct part. The connection between the first duct part and the second duct part is fixed tightly by welding.

It is an object of the invention to provide a pipe system, a method and an apparatus for connecting at least one duct part of the pipe system of the above-mentioned kind, in which the connection may be realized easily directly inside the mold without external ejection process and the connection is reliable and tight.

SUMMARY OF THE INVENTION

The object is achieved by that, the at least one blow-molded duct part is shrinked mounted onto the at least one fitting.

According to the present invention, the at least one fitting is inserted in the at least one blow-molded duct part while the duct part is plasticized. Due to the shrinking a non-positive connection between the at least one blow-molded duct part and the at least one fitting may be realized which may be actuated by adherence. The at least one fitting is a male part. It may be a nipple or a pipe socket. The at least one fitting may be connected to a second duct part. A connecting end of the second duct part may be formed as a fitting. An external diameter of the at least one fitting, in particular the connecting end of the second duct part, can correspond to an internal diameter of the connection end of the at least one blow-molded duct part.

Preferably the external diameter of the at least one fitting may be between 15 mm and 70 mm. The internal diameter of the connection end of the at least one blow-molded duct part may be between 15 mm and 70 mm. The shape of the duct part may be circular or oval.

Preferably a wall thickness of the at least one fitting may be between 2 mm and 4 mm. A wall thickness of the at least one blow-molded duct part may be between 2 mm and 4 mm. The at least one fitting may be inserted in the at least one blow-molded duct part before the plasticized material of the blow-molded duct part is cooled down. During the cooling the at least one blow-molded duct part shrinks onto the at least one fitting, so a tight connection can be realized. Additional tools in particular for welding are not necessary. Advantageously the at least one fitting may be inserted during the blowing phase of the at least one blow-molded duct part. Preferably a radial outer surface of the at least one fitting may be graded in axial direction. So during the shrinkage the shape of the pipe wall of the at least one blow-molded duct part adapts to the outline of the radial outer circumferential side of the at least one fitting. In this way a positive locking connection between the at least one blow-molded duct part and the at least one fitting may be realized. The positive locking connection may be realized alternatively or additionally to the non-positive connection. In particular the radial outer surface of the at least one fitting may be sawtoothed, so the stability of the positive locking connection is further increased. In particular, the pipe system may be part of a turbo link, an air connection or a connection of a filter. Further, the pipe system may be part of a so-called Christmas tree configuration. A Christmas tree can be an assembly of valves, spools and fittings.

According to a favorable embodiment of the invention, the at least one blow-molded duct part may be connected to the at least one fitting by material engagement. The material engagement may be realized by fusing the materials of the at least one blow-molded duct part and the at least one fitting together. The fusion of the materials may be caused by the contact of the plasticized material of the at least one blow-molded duct part with the material of the at least one fitting. The fusion may be improved by the surface compression load due to the shrinking of the at least one blow-molded duct part. The tightness of the connection may be further increased by the material engagement. The material engagement may be realized additionally or alternatively to the non-positive connection or the positive locking connection.

Advantageously, the at least one fitting may be made of plastic. Preferably it may be made of polyamide. Polyamide is a thermoplastic which easy may be plasticized by heating. It hardens when it cools down. In particular the at least one fitting may be made of polyamide, which is chemically strengthened with 15% glass fiber. Preferably the at least one fitting may be made of a strengthened polyamide from Caprolactam, in particular known as "PA 6 15% GF", or a polyamide known as "PA 666 15% GF". Preferably, an external surface of the at least one plastic fitting may be plasticized before inserting in the at least one blow-molded duct part. For plasticizing the fitting may be heated. After inserting the fitting, the plasticized material of its surface can fuse with the plasticized material of the internal surface of the blow-molded duct part. So the material engagement between the at least one fitting and the at least one blow-molded duct part may be realized by chemical adhesion.

Advantageously, the at least one blow-molded duct part may be made of polyamide. Preferably the at least one blow-molded duct part may be made of polyamide, which is chemically strengthened with 15% glass fiber, known as "PA 6 15% GF" or "PA 666 15% GF". Polyamide easy may be plasticized by heating. Plasticized polyamide may be hardened by cooling down. Plasticized polyamide can realize a material engagement with the radial outer surface of the at least one fitting.

According to a further favorable embodiment of the invention, the at least one blow-molded duct part and the at least one fitting may be made of different materials. The materials can differ in thermal conductivity and/or temperature resistance and/or electrical conductivity and/or mechanical stability and/or flexibility. In this way the at least one blow-molded duct part and the at least one fitting may be optimized for their function each. In particular the at least one fitting may be made of a rigid material. The at least one fitting may be made of a rigid plastic or a metal. The at least one blow-molded duct part may be made of a flexible material.

According to a further favorable embodiment of the invention, a gasket may be placed between the at least one blow-molded duct part and the at least one fitting. In this way the fluid seal tightness of the connection can be increased further.

The object is further achieved by the method in that, the plastic material for realizing the at least one blow-molded duct part is plasticized by heating and formed in a blowing mold, the plasticized at least one blow-molded duct part is shrinked onto the at least one fitting, the plasticized at least one blow-molded duct part is cooled down.

All features and advantages of the above-mentioned inventive pipe system apply analogous to the inventive method and its favorable embodiments.

Advantageously, the plasticized plastic material may be extruded. Therefore a method of suction extruding by use of an extruder may be performed. The extruded plastic material may be blow-molded by use of the blowing mold. Extruding and blow molding can happen during just several seconds. Scraps of the blow-molded duct part may be cut off. Then the plasticized at least one blow-molded duct part may be moved to the at least one fitting. Advantageously, the blowing mold with the blow-molded duct part may be moved to the at least one fitting. The at least one fitting may be strongly inserted in the plasticized at least one blow-molded duct part. Therefore the at least one fitting may be mounted on a lifter which may be positioned by an actuator. During the insertion of the at least one fitting, the at least one blow-molded duct part can still be placed within the blowing mold. After the insertion of the at least one fitting, the at least one blow-molded duct part may be cooled down. During the down cooling, the at least one blow-molded duct part can shrink tight on the at least one fitting. In this way, the at least one duct part is blow-molded on the at least one fitting, effectively.

According to a favorable embodiment of the invention, the at least one fitting may be heated before the plasticized at least one duct part is shrinked onto the at least one fitting. In this way the at least one fitting and the at least one duct part may be connected by material engagement. Advantageously, the at least one fitting may be made of plastic. Thus the plastic material of the at least one duct part and the material of the at least one fitting can fuse. So a material engagement between the at least one fitting and the at least one blow-molded duct part may be realized by chemical adhesion.

The object is further achieved by the apparatus by a cutting device for trimming the at least one blow-molded duct part, a driver for moving the blowing mold to the device for inserting the at least one fitting, whereby the device for inserting the at least one fitting has means for pushing the at least one fitting into the at least one duct part. The device for inserting the at least one fitting can also have heating means for heating the at least one fitting before pushing it into the at least one duct part. The extruder may be a suction extruder. All features and advantages of the above-mentioned inventive pipe system and the above-mentioned inventive method apply analogous to the inventive apparatus and its favorable embodiments.

BRIEF DESCRIPTION OF THE DRAWINGS

The present invention together with the above-mentioned and other objects and ad-vantages may best be understood from the following detailed description of the embodiments, but not restricted to the embodiments, wherein is shown schematically.

Figure 1:
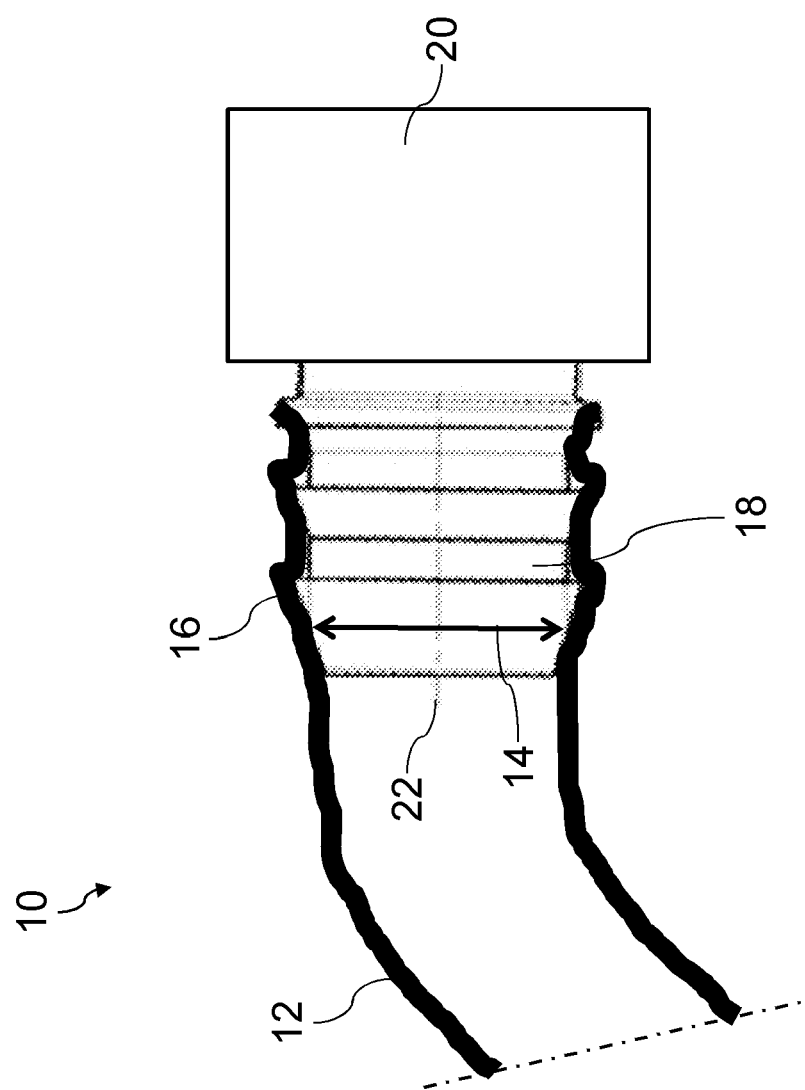
FIG. 1 a detail of an air intake system of an internal combustion engine of a motor vehicle with a duct part which is connected to a fitting, whereby the duct part is shown in a longitudinal section.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In FIG. 1 a detail of an air intake system 10 of an internal combustion engine of a motor vehicle is depicted. The air intake system 10 has a first duct part 12. The first duct part 12 is shown in a longitudinal section. The first duct part 12 is blow-molded of poly-amide. The polyamide is chemically strengthened with 15% glass fiber. Preferably so-called "PA6 15% GF" or "PA666 15% GF" can be used. An internal diameter of the first duct part 12 at its shown connection end 16 varies between 15 mm and 70 mm, preferably between 47 mm and 52 mm. The internal diameter is indicated in FIG. 1 with a double arrow 14. A wall thickness of the first duct part 12 is between 2 mm and 4 mm, preferably 3 mm.

The air intake system 10 further has a fitting 18 for connecting the first duct part 12 with a second duct part 20 of the air intake system 10. The fitting 18 is a tube section. In FIG. 1 it is shown in a side view. The fitting 18 is inserted tightly in the connection end 16 of the first duct part 12. The first duct part 12 is shrinked onto the fitting 18. The first duct part 12 is connected to the fitting 18 by a combination of material engagement, non-positive connection and positive locking connection.

The fitting 18 is made of plastic. It is connected in one piece to the second duct part 20. The first duct part 12 and the fitting 18 are made of different materials. The radial outer circumferential side of the fitting 18 is sawtoothed in axial direction. An imaginary axis of the fitting 18 is indicated with a broken line 22. The shape of the pipe wall of the first duct part 12 is adapted to the radial outer circumferential side of the fitting 18. In this way the positive locking connection between the first duct part 12 and the fitting 18 is realized. An external diameter of the fitting 18 corresponds to the internal diameter 14 of the connection end 16 of the first duct part 12. It is between 35 mm and 70 mm. Preferably it is between 47 mm and 52 mm. A wall thickness of the fitting 18 is between 2 mm and 4 mm, preferably 3 mm. Due to the tight shrinking of the first duct part 12, the nonpositive connection by actuation by adherence is realized.

Figure 2:
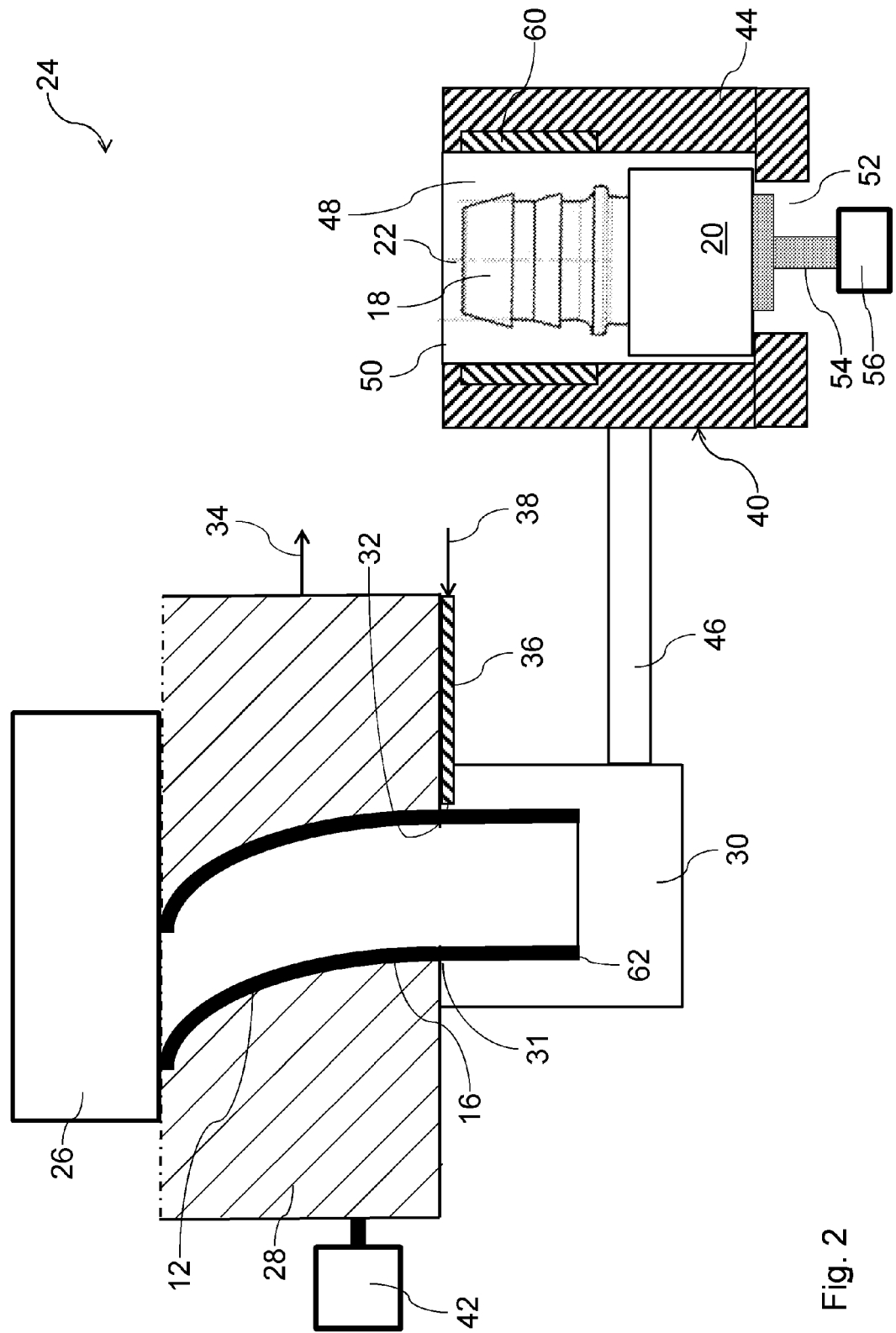
FIG. 2 an apparatus for connecting the duct part of the pipe system of FIG. 1 with the fitting in an early production step.
Figure 3:
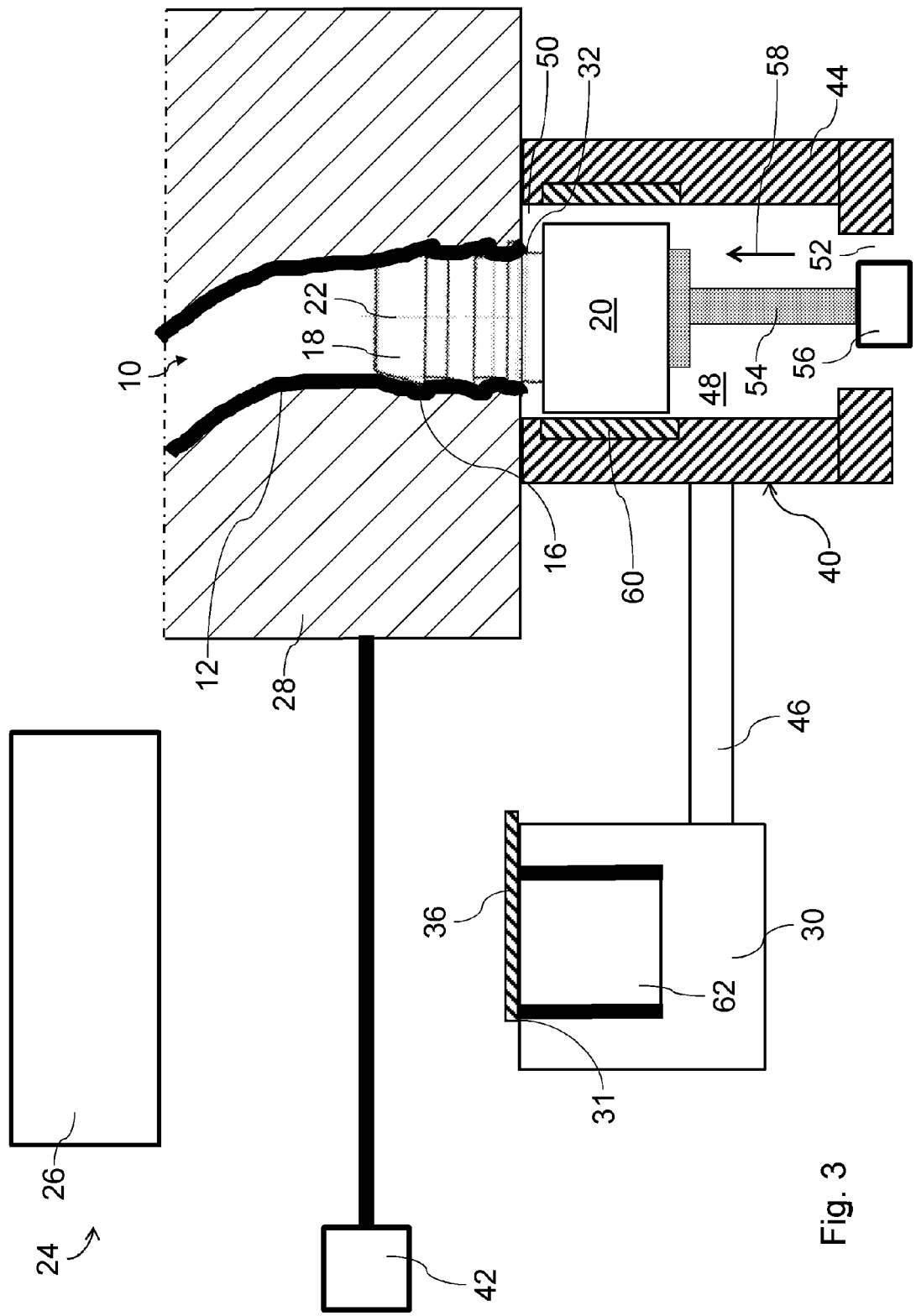
FIG. 3 the apparatus of FIG. 2 in a posterior production step.

In FIGS. 2 and 3 an apparatus 24 for connecting the first duct part 12 with the second duct part 20 by use of the fitting 18 is shown in two different production steps.

The apparatus 24 has an extruder 26 for extruding polyamide to a parison which is formed in a blowing mold 28 to the first duct part 12. Further the apparatus 24 has a suction housing 30, into which a leading end of the parison is sucked for forming the parison to the first duct part 12. The suction housing 30 is placed on the opposite side of the extruder 26. It has an opening 31. In a state of extruding and blow molding of the first duct part 12, the opening 31 is connected with an outlet opening 32 of the blowing mold 28. The state of the apparatus 24 of extruding and blow molding of the first duct part 12 is shown in FIG. 2. The extruder 26 and the suction housing 30 are fixed relative to another.

Between the blowing mold 28 and the suction housing 30 a blade 36 for trimming the first duct part 12 is mounted on the suction housing 30. The blade 36 is movable parallel to a surface of the blowing mold 28, which abuts on the suction housing 30. In FIG. 2 a moving direction of the blade 36 is indicated with an arrow 38.

The blowing mold 28 is movable in direction of an arrow 34 relative to the extruder 26 and the suction housing 30 toward a device for inserting 40 the fitting 18 tight in connection end 16 of the first duct part 12. Therefore the apparatus 24 has a driver 42 for moving the blowing mold 28 toward the device for inserting 14. A housing 44 of the device for inserting 40 is affixed to the suction housing 30 by a bridge 46. At a further favorable contrary embodiment, the blowing mold 28 is fixed and the fitting apparatus is moved.

The housing 44 has a cylindrical interior 48, in which the second duct part 20 with the fitting 18 can be placed. At a front side of the interior 48 the housing 44 has an assembling opening 50. In the state of inserting the fitting 18, the assembling opening 50 is coaxial to the outlet opening 32 of the blowing mold 28. The state of inserting the fitting 18 of the apparatus 24 is shown in FIG. 3.

On the side opposite to the assembling opening 50, the housing 44 has an actuator opening 52. The actuator opening 52 is coaxial to the assembling opening 50. A piston 54 of an actuator 56 leads through the actuator opening 52. The piston 54 is movable in the interior 48. A moving direction of the piston 54 is axial to the interior 48. In FIG. 3, the moving direction is indicated with an arrow 58.

Near the assembling opening 50, a cylindrical heating element 60 is placed at the radial inner circumferential side of the housing 44. Preferably the heating element 60 is electrically operated.

An exemplary method for connecting the first duct part 12 with the second duct part 20 by use of the fitting 18 is described with the help of FIGS. 2 and 3.

The apparatus 24 is in its state of extruding as shown in FIG. 2. The extruder 26 is provided with the polyamide for the first duct part 12. The pre-casted second duct part 20 with the fitting 18 is placed in the interior 48 of the housing 44 of the device for inserting 40. The fitting 18 is coaxial to the assembling opening 50. The free end of the fitting 18 points to the assembling opening 50. The second duct part 20 is mounted on the free end of the piston 54. The fitting 18 is placed inside the heating element 60.

The polyamide is heated and plasticized within the extruder 26. The plasticized polyamide is extruded with the extruder 26 and blown to the parison in the blowing mold 28. The parison is sucked with its leading end into the suction housing 30. So the parison is sucked into the blowing mold 28 and formed to the first duct part 12.

The blade 36 is moved in direction 38 to cut off the scrap 62 of the leading end of the first duct part 12 which is within the suction housing 30. So the first duct part 12 is trimmed.

The blowing mold 28 together with the first duct part 12 is moved in direction 34 toward the device for inserting 40. As it is shown in FIG. 3, the leading end, which realizes the connection end 16 of the first duct part 12, then is coaxial to the fitting 18 in the interior 48 of the housing 44.

The fitting 18 is heated by the heating element 60. The radial outer surface of the fitting 18 so is plasticized.

The piston 54 is moved by the actuator 56 in moving direction 58 toward the assembling opening 50, so that the fitting 18 is pushed in the still plasticized connection end 16 of the first duct part 12.

The plasticized first duct part 12 is cooled down. For this the blowing mold 28 can be cooled down. Thereby the plasticized first duct part 12 is shrinked onto the fitting 18. During the shrinkage of the first duct part 12 the shape of its pipe wall adapts to the profile of the radial outer circumferential side of the fitting 18. The plasticized material on the radial outer circumferential side of the fitting 18 fuses with the plasticized material of the first duct part 12 for realizing the material engagement. The first duct part 12 and the second duct part 20 are connected tight by use of the fitting 18.

After the connection of the first duct part 12 with the fitting 18 is firm, the blowing mold 28 is removed from the housing 44. The blowing mold 28 is opened and the first duct part 12 with the fitting 18 and the second duct part 20 are removed.

The invention is not limited to an air intake system 10 of an internal combustion engine of a motor vehicle. The invention can also be applied for other kinds of pipe systems for fluids. For example it can be used for a turbocharger of an internal combustion engine. The invention can be applied for pipe systems for other gases or liquids, for example oil, fuel or water. The invention is further applicable to other kinds of internal combustion engines, for example to industrial engines.

The air intake system 10 can have more than one blow-molded first duct part 12. The air intake system 10 can have more than one fitting 18.

Instead of being connected with the second duct part 20, the first duct part 12 can also be connected with another part of the air intake system 10, for example with a housing of an air filter or a so-called Christmas tree.

The internal diameter 14 of the connection end 16 of the first duct part 12 can be less than 35 mm or more than 70 mm. Accordingly, the external diameter of the fitting 18 can be less than 35 mm or more than 70 mm.

The wall thickness of the first duct part 12 can be less than 2 mm or more than 4 mm. The wall thickness of the fitting 18 can be less than 2 mm or more than 4 mm.

Instead of being sawtoothed the radial outer circumferential side of the fitting 18 can be graded in axial direction in a different way. For example it can be wavy. The radial outer circumferential side of the fitting 18 can also be straight in axial direction.

The connection between the first duct part 12 and the fitting 18 can be realized by material engagement or non-positive connection, in particular actuation by adherence, or positive locking connection or a combination of those connection types.

The first duct part 12 also can be made of polyamide which is strengthened with more or less than 15% glass fiber. Also polyamide without glass fiber can be used. The first duct part 12 can also be made of another kind of plastic material.

The fitting 18 can also be made of polyamide. The polyamide also can be chemically strengthened with 15% glass fiber, for example so-called "PA6 15% GF" or "PA666 15% GF". Also polyamide with more or less than 15% glass fiber or without glass fiber can be used. The fitting 18 also can be made of a material different from plastic. For example it can be made of metal.

The first duct part 12 and the fitting 18 can also be made of the same material.

A gasket can be placed between the first duct part 12 and the fitting 18.

Instead of one cylindrical heating element 60 also multiple heating elements can be placed at the radial inner circumferential side of the housing 44.

The order of the procedural steps of the exemplary method for connecting the first duct part 12 with the fitting 18 can be different.

Also an alternative method for connecting the duct parts 12 and 20 by use of the fitting 18 can be applied, which differs from the described exemplary method.

The first duct part 12 can be shrinked onto the fitting 18 without heating the fitting 18 beforehand.

The first duct part 12 can be connected with the fitting 18 by use of an apparatus different from the exemplary described apparatus 24.

In the foregoing specification, specific embodiments of the present invention have been described. However, one of ordinary skill in the art appreciates that various modifications and changes may be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for connecting at least one duct part (12) of a pipe system of an intake system (10) or a turbocharger of an internal combustion engine, comprising:
   providing at least one fitting (18);
   providing a blow mold to mold the at least one duct part (12);
   plasticizing a plastic material by heating;
   forming the least one duct part (12) in the blow mold from the plasticized plastic material in a blow molding process;
   inserting tightly the at least one fitting (18) into the plasticized at least one blow-molded duct part (12) in the blow mold while the duct part is plasticized directly inside the blow mold, wherein the at least one fitting (18) is inserted into the at least one duct part (12) before the plasticized material of the at least one duct part (12) is cooled down;
   shrinking the plasticized at least one blow-molded duct part (12) onto the at least one fitting (18);
   cooling the at least one blow-molded duct part (12) to solidify the plastic material on the at least one fitting (18).

2. The method according to claim 1, wherein
before the shrinking step, the method further comprises heating the at least one fitting (18).

3. The method according to claim 1, wherein
in the providing at least one fitting step, the at least one fitting (18) is made of plastic.

4. The method according to claim 1, wherein
in the step of plasticizing a plastic material, the plastic material is a polyamide.

5. The method according to claim 1, wherein before the inserting step, the method further comprises
trimming the at least one duct part while the at least one duct part is plasticized in the blow mold.

6. The method according to claim 4, wherein
in the step of plasticizing a plastic material, the polyamide is chemically strengthened with glass fibers.

7. The method according to claim 4, wherein
in the step of providing at least one fitting, the at least one fitting is made of polyamide.

8. The method according to claim 7, wherein
in the step of providing at least one fitting, the polyamide is chemically strengthened with glass fibers.

9. The method according to claim 4, wherein
before the inserting step, the method further comprises:
   heating the at least one fitting, plasticizing the fitting;
wherein the step of cooling the at least one blow-molded duct part to solidify the plastic material on the at least one fitting, the step further comprises:
   chemically adhering the plasticized at least one fitting into the plasticized at least one duct part.

10. The method according to claim 6, wherein
in the step of providing at least one fitting, the at least one fitting is made of polyamide chemically strengthened with glass fibers;
before the inserting step, the method further comprises:
   heating the at least one fitting, plasticizing the fitting;
wherein the step of cooling the at least one blow-molded duct part (12) to solidify the plastic material on the at least one fitting (18) further comprises
   chemically adhering the plasticized at least one fitting into the plasticized at least one duct part.

* * * * *